United States Patent [19]
Ziegelmeyer, deceased et al.

[11] Patent Number: 5,372,159
[45] Date of Patent: Dec. 13, 1994

[54] ENGINE FUEL FLOW CONTROL MECHANISM

[75] Inventors: Harold Ziegelmeyer, deceased, late of Eaglepoint, Oreg., by Patricia W. Ziegelmeyer, heiress; Arnold Bjork, Eaglepoint, Oreg.

[73] Assignee: Bjork Investment Group, Inc., Sacramento, Calif.

[21] Appl. No.: 115,197

[22] Filed: Aug. 31, 1993

[51] Int. Cl.⁵ .............................................. G05D 16/08
[52] U.S. Cl. .................. 137/505.14; 123/512; 137/505.42
[58] Field of Search .................. 137/505.14, 505, 907, 137/505.42; 123/463, 512

[56] References Cited

U.S. PATENT DOCUMENTS

| | | | |
|---|---|---|---|
| 2,737,167 | 3/1956 | Dickey | 123/512 |
| 3,159,151 | 12/1964 | Woodward | 123/463 |
| 3,741,240 | 6/1973 | Berriman | 123/512 X |
| 4,257,378 | 3/1981 | Bascle | 123/512 |
| 4,745,904 | 5/1988 | Cagle | 123/512 |
| 4,790,343 | 12/1988 | Mochizuki | 137/510 |
| 4,936,342 | 6/1990 | Kojima et al. | 137/510 |

*Primary Examiner*—Stephen M. Hepperle
*Attorney, Agent, or Firm*—Bielen, Peterson & Lampe

[57] ABSTRACT

An engine fuel line flow control mechanism utilizing a valve located within a fuel line. The valve includes a seat and a movable seal which is capable of regulating the flow of fuel through the fuel line. An actuator is linked to the valve and may include a piston found within a chamber which is connected to the seal of the valve. The piston is also connected to an engine manifold pressure conduit such that the piston moves in response to changes in manifold pressure of the engine.

11 Claims, 3 Drawing Sheets

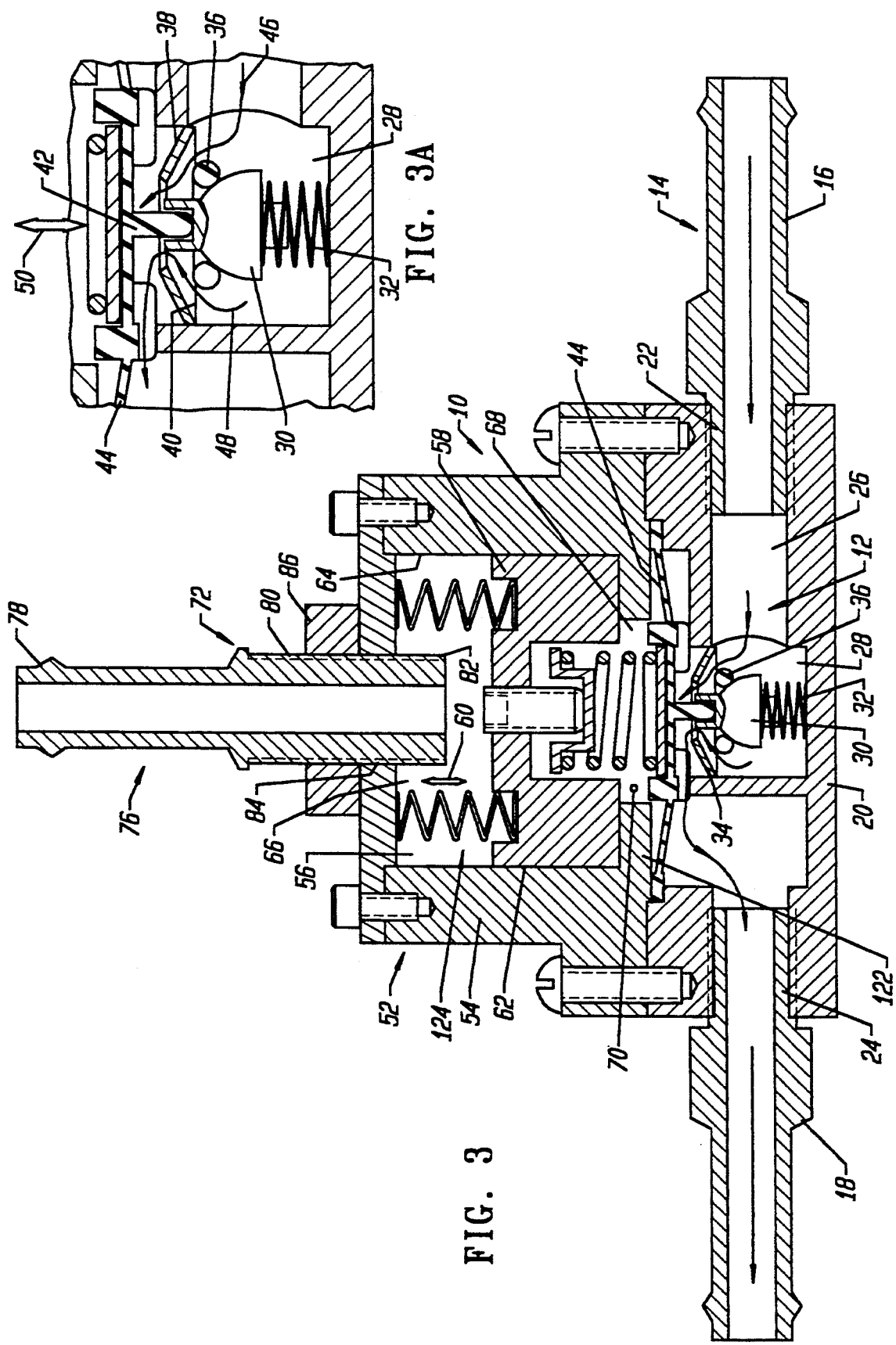

ENGINE FUEL FLOW CONTROL MECHANISM

BACKGROUND OF THE INVENTION

The present invention relates to a novel engine fuel line control mechanism.

Carbureted engines utilize a carburetor to combine fuel and oxygen containing air. Fuel flow to the carburetor enters the carburetor through a fuel line or conduit motivated by a fuel pump. Fuel flow has been controlled in the past by two primary methods: through a mechanically set fuel pressure regulator and/or through a high pressure bypass system controlled by the engine vacuum.

A mechanically set regulator suffers in that high power demands of the engine results in an improper fuel flow thereto. In other words, prolonged engine demand at a low pressure regulator setting causes a lean burn in the engine, which may result in burned engine valves.

A high pressure bypass system allows for full fuel system pressure or delivery to the carburetor float valve at all times. This "overriding" of the carburetor float system can result in "cylinder wash" at low engine power demand. Again, "cylinder wash" can substantially damage an engine. U.S. Pat. Nos. 4,790,343 and 4,936,342 represent pressure regulators for carburetted engines that are susceptible to "cylinder wash."

A fuel control mechanism which eliminate "lean burn" and "cylinder wash" be a notable advance in the engine field.

SUMMARY OF THE INVENTION

In accordance with the present invention a novel and useful engine fuel line control mechanism is provided.

The mechanism of the present invention involves a carburetted gasoline internal combustion engine to control fuel flow relative to the engine demand. The mechanism includes as one its elements a valve possessing a seat and movable seal. The valve is positioned within the fuel line and is capable of controlling the flow of fuel therein by the position of the seal relative to the seat. Such valve may be of conventional construction.

An actuator is also included in the present invention and is linked to the valve, specifically to the seal of the valve where that portion of the valve is movable. The actuator itself is capable of movement sufficient to drive the seal relative to the seat and, thus, regulate the flow of fuel through the valve. The actuator may take the form of a housing having a chamber. A movable piston or plug is found within the chamber in sealing engagement with the walls of the chamber. Spring means is also included for locating the plug in a pre-determined position within the chamber. Such spring means balances the plug as desired, which will be discussed in further hereinafter. The plug within the chamber may include a first side and an opposite second side. The spring means may further take the form of at least one spring interposed the first side of the plug in the housing, and at least another spring interposed the second side of the plug and the valve. In certain embodiments, the at least one spring interposed the first side of the plug and the housing may include a plurality of springs. A plate may also be included in the present mechanism and is capable of pressing the seal of the valve. Such plate would also contact the spring on the second side of the plug within the chamber.

Connection means may be found in the present invention for communicating the actuator with an engine manifold pressure conduit which carries the engine manifold pressure therein. The actuator, although initially located at a certain position within the chamber, would then be capable of moving in response to changes in manifold pressure. Such movement, of course, would regulate the fuel flow through the fuel line, since the plug is linked to the valve located within the fuel line. In this manner, an increased manifold pressure or decreased vacuum in the manifold would send more fuel to the carburetor of the engine and vice versa.

The chamber may also include stop means for limiting the extreme travel of the plug or piston there within. Such stop means may take the form of a flange or flanges within the chamber. In addition, a hollow member may extend into the chamber and communicate with the manifold pressure conduit. A hollow member may include a threaded surface which threadingly engages a threaded opening into the chamber such that the hollow member may be screwed into and out of the chamber a certain distance. The hollow member may include an end portion extending into the chamber that contact the plug and limits travel in one direction.

The plug location within the chamber in relation the spring means may be further adjusted by a protuberance which is found on the plug itself. The protuberance may also be threadingly engagable with a threaded through on the plug. It has been found that such protuberance is useful in adjusting the position of the plug within the chamber when the engine is at idle. Such protuberance may also be capable of contacting a bowl-shaped plate which is connected to at least one spring on the second side of the plug.

It may be apparent that a novel and useful carburetted engine fuel line flow control mechanism has been described.

It is therefore an object of the present invention to provide a flow control mechanism for a carburetted engine which is responsive to high and low power demands of the engine, thus permitting such engine to operate in a more efficient manner.

Another object of the present invention is to provide a fuel flow control mechanism for a carburetted engine which prevents damage to the engine under extreme operating conditions recognized as "lean burn" and "cylinder wash."

Yet another object of the present invention is to provide a fuel line flow control mechanism for an engine which would be easily retrofitted to an existing engine and increase the fuel efficiency of the same.

A further object of the present invention is to provide a fuel line flow control mechanism for a carburetted engine which reduces undesirable engine emissions.

Another object of the present invention is to provide a fuel flow control mechanism for a carburetted engine which is capable of reacting to failure of pressure regulators in the fuel line and avoids damage to the engine thereby.

The invention possesses other objects and advantages especially as concerns particular characteristics and features thereof which will become apparent as the specification continues.

BRIEF DESCRIPTION OF THE DRAWINGS

FIG. 3 is a sectional view of the mechanism of the present invention showing the fuel valve in an open position.

FIG. 3A is an enlarged sectional view of a portion of the mechanism depicted in FIG. 3.

Figure 1:
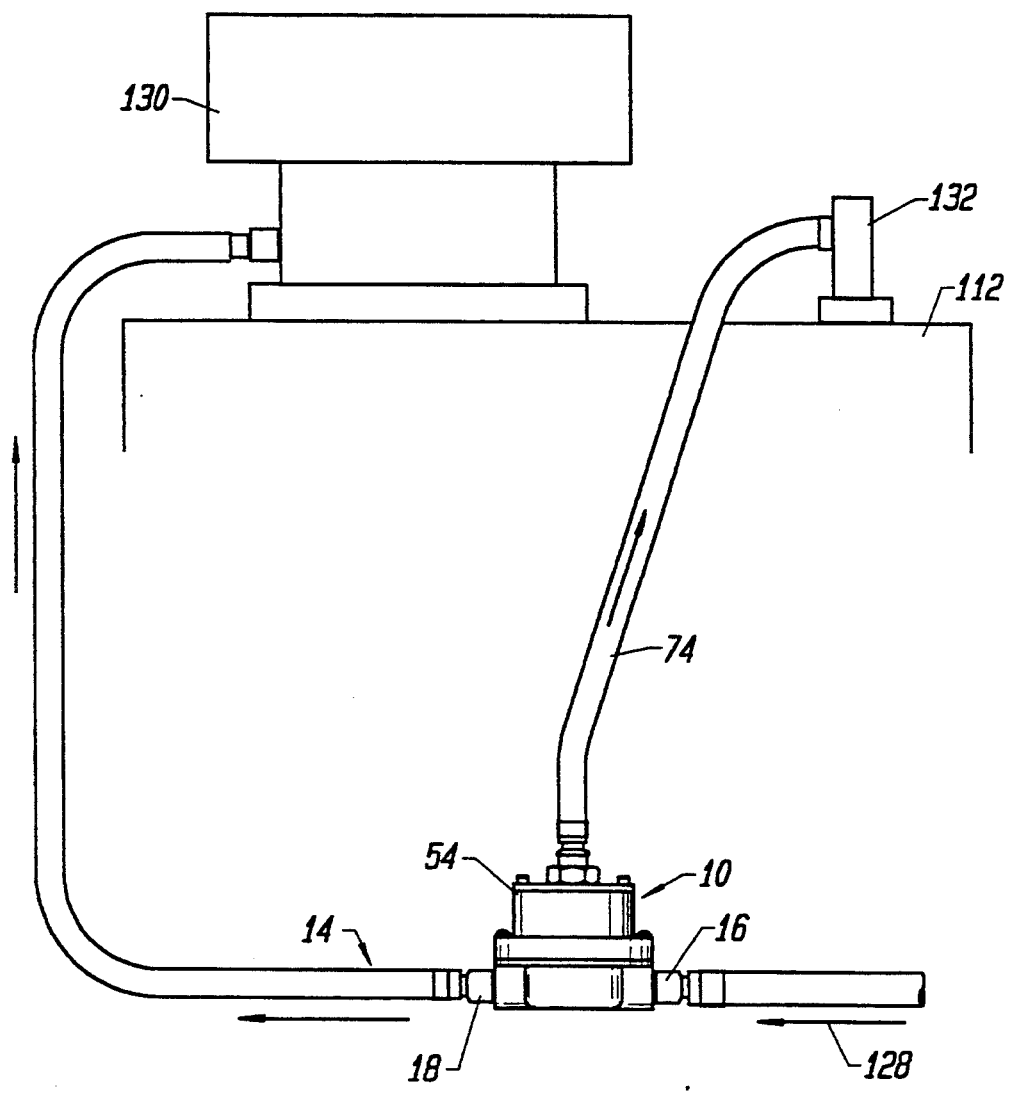
FIG. 1 is an overall schematic depicting the mechanism of the present invention installed in a typical engine environment.

For a better understanding of the invention reference is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred embodiments which should be taken in conjunction with the prior described drawings.

The invention as a whole is depicted in the drawings by reference character 10. The fuel flow control mechanism 10 includes as one of its elements a valve 12, FIGS. 2, 3 and 3A. Valve 12 is located in fuel line 14 and includes rigid fittings 16 and 18. A casing 20 is capable of threadingly accepting threaded end portions 22 and 24 of fittings 16 and 18, respectively. Passage way 26 leads to a cavity 28 having a conically shaped nipple 30 which is moveable upwardly and downwardly against spring 32. Cup 34 lies atop nipple 30 which is also surrounded by an O-ring 36. Washer 38 rests atop a platform 40 within cavity 28. Finger 42 extends from a diaphragm 44 constructed of flexible and elastomeric material such neoprene. With reference to FIG. 3A, it may be observed that diaphragm 44 and finger 42 has pressed nipple 30 downwardly such that O-ring 36 is not contacting washer 38. O-ring 36 and washer 38 should be considered the seat and seal of valve 12. Directional arrows 46 and 48 indicate the flow of fuel through valve 12 in this condition. Directional arrow 50 indicates the up and down movement of diaphragm 44 to effect this condition. Valve 12 within casing 20, including diaphragm 44, is a commercially available product which falls under the designation Profuel, sold by Purolator, Inc. of Ithica N.Y.

The present invention also possesses an actuator 52 which is linked to valve 12 and is capable of driving nipple 30 relative to O-ring 36. Specifically, actuator 52 includes a housing 54 possessing a chamber 56. Cylindrical plug or piston 58 is found within cylindrical chamber 56 and moves up and down therewithin according to directional arrow 60. The outer surface 62 of plug 58 sealingly engages the inner wall 64 of chamber 56. Lubricants (not shown) may be employed between outer surface 62 of plug 58 and wall 64 of chamber 56. Thus, chamber 56 may be subdivided into an upper portion 66 and a lower portion 68. Aperture 70 extends through housing 54 to permit lower portion 68 of chamber 56 to remain at atmospheric pressure.

Connection means 72 is also included in the present invention for communicating actuator 52, specifically upper portion 66 of chamber 56, to manifold pressure conduit 74, FIGS. 1 and 3. Consequently, upper portion 66 of chamber 56 lies at the manifold pressure valve within conduit 74. Connection means 72 is found in the embodiment depicted in FIGS. 2 and 3 as a hollow member 76 having a first portion 78 adapted to fit manifold pressure conduit or hose 74, FIG. 1. Second portion 80 of hollow member 76 includes a threaded outer surface 82 which threadingly engages a threaded bore 84 leading into upper portion 66 of chamber 56. Nut 86 secures hollow member 76 in a desired position such that second portion 80 extends a pre-determined distance into upper portion 66 of chamber 56.

Figure 2:
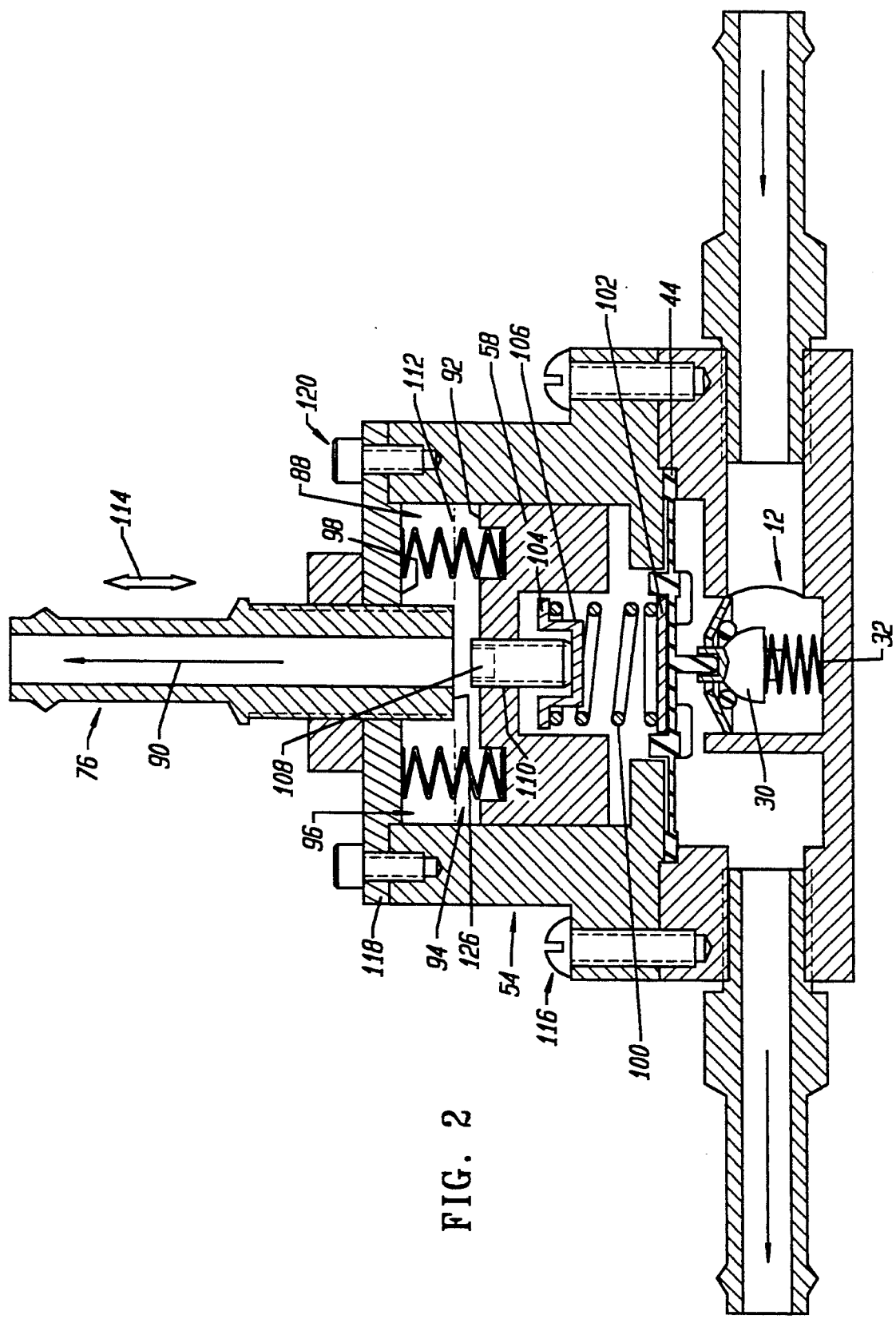
FIG. 2 is a sectional view of the mechanism of the present invention showing the fuel valve in a closed position.

Spring means 88 locates plug 58 within the chamber 56, especially when plug 58 is under the influence of the manifold pressure sensed through hollow member 76 according to directional arrow 90, FIG. 2. The first side 92 of plug 58 is provided with a series of recesses 94 which are capable of holding a plurality of springs 96. In the embodiment shown in FIG. 2, six springs are employed in plurality of springs 96, although only two are shown in FIG. 2. Chamber 56 and plug 58 being cylindrical in shape, plurality of springs 96 surround the central portion of plug 58 in this regard. Each of the plurality of springs 96 contacts ceiling 98 of housing 54 to urge piston or plug 58 downwardly. Spring 100 rests on a plate 102 which itself contacts diaphragm 44. Spring 100 also rests on a circular flange of bowl 106. Protuberance 108 threadingly engages a bore 110 through the center of cylindrical plug 58. Thus, plug 58 is balanced in a position within chamber 56 according to the strength of plurality of springs 96, spring 100, and spring 32 supporting nipple 30. Dashed line 112 on FIG. 2 represents an ideal position of plug 58 at idle speed of an engine 112 connected to manifold pressure conduit 74, FIG. 1. This position is achieved by threading hollow member 76 upwardly or downwardly according to directional arrow 114 and the adjustment afforded by moving protuberance 108 upwardly or downwardly within threaded bore 110 of plug 58. In such a position, valve 12 would be slightly open rather in than the closed position as depicted in FIG. 2.

Housing 54 is fastened to casing 20 by plurality of set screws 116. The integrity of chamber 56 is maintained by a cover 118 which is held in place by plurality of set screws 120. Flange 122 within housing 54 serves as a portion of stop means 124 which limits the travel of plug 58 within chamber 56. It should be noted, that the lower edge 126 of hollow member 76 serves the same purpose at the other extreme position of plug 58.

In operation, mechanism 10 is placed within fuel line 14 such that fitting 16 accepts fuel from a fuel pump (not shown), directional arrow 128. Fuel passing through valve 12 continues through fuel line 14 to carburetor 130. Manifold pressure conduit 74 connects to a manifold vacuum fitting 132 on engine 112. It should be noted that such a fitting is normally found on most engines of vehicles, and is sufficiently displaced from carburetor 130 at engine 112. Plug 58 is then set to lie against edge 126 of hollow member 76 while the engine is at idle. This is achieved by adjusting the position of hollow member 76 per directional arrow 114 and the position of protuberance 108 within threaded bore 110. Engine 112 develops about 20 inches of vacuum at idle. This pressure is found in manifold pressure conduit 74. At full engine demand, the plug 58 is in the position depicted in FIGS. 3 and 3A, where a greater amount of fuel is passing through valve 12 to carburetor 130. Typically, such a pressure is about 12 inches of vacuum within manifold pressure conduit 74. Thus, mechanism 10 is capable of regulating the fuel flow to carburetor 130 based on a value of the manifold pressure, which corresponds to the lower demand of engine 112. It has been found that mechanism 10 increases the fuel efficiency of engine 112 and eliminates damage to the engine through "lean burn" and "cylinder wash" conditions found in the prior art. Also, undesirable emissions from engine 112 are greatly reduced by mechanism 10.

While, in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. An engine fuel line flow control mechanism in conjunction with a vehicle, manifold pressure conduit comprising;
    a. a valve including a seat and a movable seal, said valve being positioned within the fuel line to control the flow of fuel therein;
    b. an actuator linked to said valve, said actuator being capable of movement sufficient to drive said seal relative to said seat and, thus regulate flow of fuel through said valve, thereby, said actuator including a housing having a chamber, found within said chamber, and spring means for locating said plug in a pre-determined position within said chamber, said plug including a first side and an opposite second side and said spring means including at least one spring interposed said first side of said plug and said housing, and at least one spring interposed said second side of said plug and said valve; and
    c. connection means for communicating said actuator with the engine manifold pressure conduit, said actuator movement being in response to changes in manifold pressure.

2. The mechanism of claim 1 which additionally comprises a plate capable of pressing said seal of said valve.

3. The mechanism of claim 2 which additionally comprises a protuberance on said plug, said protuberance being capable of extending to said second side of said plug to exert force of said at least one spring on said second side of said plug.

4. The mechanism of claim 3 which additionally comprises a plate interposed said protuberance and said at least one spring on said second side of said plug.

5. The mechanism of claim 3 in which said protuberance includes means for adjustably positioning said protuberance relative to said plug.

6. The mechanism of claim 5 in which said means for adjustably positioning said protuberance relative to said plug includes said protuberance having a threaded outer surface and said plug having a threaded bore, said threaded outer surface of said protuberance threadingly engaging said threaded bore of said plug.

7. An engine fuel line flow control mechanism in conjunction with a vehicle, manifold pressure conduit comprising;
    a. a valve including a seat and a movable seal, said valve being positioned within the fuel line to control the flow of fuel therein;
    b. an actuator linked to said valve, said actuator being capable of movement sufficient to drive said seal relative to said seat and, thus to regulate flow of fuel through said valve, thereby, said actuator including a housing having a chamber, and a movable plug found within said chamber, said movable plug sealingly engaging the walls of said chamber; and
    c. connection means for communicating said actuator with the engine manifold pressure conduit, said in response to changes in manifold pressure.

8. The mechanism of claim 7 which further comprises stop means for limiting the travel of said moveable plug within said chamber.

9. The mechanism of claim 8 in which said connection means includes a hollow member extending from connection with the vehicle manifold pressure conduit to the interior of said chamber, and adjustments means for determining the portion of said hollow member extending into said chamber, said portion of said hollow member extending into said chamber being capable of contacting said moveable plug to serve as stop means for limiting the travel of said movable plug within said chamber.

10. An engine fuel line flow control mechanism in conjunction with a vehicle, manifold pressure conduit comprising;
    a. a valve including a seat and a movable seal, said valve being positioned within the fuel line to control the flow of fuel therein;
    b. an actuator linked to said valve, said actuator being capable of movement sufficient to drive said seal relative to said seat and, thus to regulate flow of fuel through said valve, thereby, said actuator including a housing having a chamber, a movable plug found within said chamber, and spring means for locating said plug in a pre-determined position within said chamber, said plug including a first side and an opposite second side, and said spring means including a plurality of springs interposed said first side of said plug and said housing, and at least one spring interposed said second side of said plug and said valve; and
    c. connection means for communicating said actuator with the engine manifold pressure conduit, said actuator movement being in response to changes in manifold pressure.

11. An engine fuel line flow control mechanism in conjunction with a vehicle, manifold pressure conduit comprising;
    a. a valve including a seat and movable seal, said valve being positioned within the fuel line to control the flow of fuel therein;
    b. an actuator linked to said valve, said actuator being capable of movement sufficient to drive said seal relative to said seat and, thus to regulate flow of fuel through said valve, thereby, said actuator including a housing having a chamber, a movable plug found within said chamber, and spring means for locating said plug in a pre-determined position within said chamber; said spring means including at least one spring located on a first side of said plug and another spring located on a second side of said plug; and
    c. connection means for communicating said actuator with the engine manifold pressure conduit, said actuator movement being in response to changes in manifold pressure.

* * * * *